(12) United States Patent
Alaoui et al.

(10) Patent No.: US 11,468,250 B2
(45) Date of Patent: Oct. 11, 2022

(54) READER DEVICE FOR READING INFORMATION STORED ON A MAGNETIC STRIP AND A METHOD FOR DECODING THE READ INFORMATION

(71) Applicant: Crocus Technology SA, Grenoble (FR)

(72) Inventors: Ali Alaoui, Lyons (FR); Hakan Ates Gurcan, Los Gatos, CA (US)

(73) Assignee: CROCUS TECHNOLOGY SA, Grenoble (FR)

( * ) Notice: Subject to any disclaimer, the term of this patent is extended or adjusted under 35 U.S.C. 154(b) by 0 days.

(21) Appl. No.: 17/299,949

(22) PCT Filed: Nov. 29, 2019

(86) PCT No.: PCT/IB2019/060323
§ 371 (c)(1),
(2) Date: Jun. 4, 2021

(87) PCT Pub. No.: WO2020/115626
PCT Pub. Date: Jun. 11, 2020

(65) Prior Publication Data
US 2021/0334482 A1 Oct. 28, 2021

Related U.S. Application Data

(60) Provisional application No. 62/776,024, filed on Dec. 6, 2018.

(51) Int. Cl.
*G06K 7/08* (2006.01)
(52) U.S. Cl.
CPC .................................. *G06K 7/087* (2013.01)
(58) Field of Classification Search
CPC ........ G06K 7/087; G06K 7/084; G06K 7/082; G06K 7/0095; G06K 7/08; G06K 7/088;
(Continued)

(56) References Cited

U.S. PATENT DOCUMENTS 4,791,283 A * 12/1988 Burkhardt ........ G06K 19/06206
235/449
5,168,275 A * 12/1992 Harrison ............ G11B 20/1419
235/449
(Continued)

FOREIGN PATENT DOCUMENTS

EP 0441280 A1 8/1991
EP 3266975 A1 1/2018

OTHER PUBLICATIONS

International Search Report for PCT/IB2019/060323 dated Feb. 25, 2020.
Written Opinion for PCT/IB2019/060323 dated Feb. 25, 2020.

*Primary Examiner* — Thien T Mai
(74) *Attorney, Agent, or Firm* — Pearne & Gordon LLP

(57) ABSTRACT

A reader device for reading information stored on a magnetic strip containing a plurality of polarized magnets, each providing a magnetic flux, said reader device including: a magnetoresistive sensor including a plurality of magnetoresistive elements and configured for reading the information stored on the magnetic strip and outputting a read signal; a processing module configured for decoding the read signal and extracting binary data; wherein the read signal includes amplitude information of the magnetic flux; and wherein the processing module is further configured for decoding the read signal using the amplitude information of the read signal is described. Further, an amplitude decoding method for decoding the read signal outputted by the reader device is described.

13 Claims, 5 Drawing Sheets

(58) Field of Classification Search
CPC ............. G06K 19/07749; G06K 1/125; G06K 19/06206; G06K 19/06187; G06K 19/12; H01F 1/00; G06Q 20/042; G06Q 20/357; G06Q 20/3415; G06Q 20/347
USPC ........................................ 235/493, 449, 450
See application file for complete search history.

(56) References Cited

U.S. PATENT DOCUMENTS

| | | | | |
|---|---|---|---|---|
| 6,141,161 | A * | 10/2000 | Sato ..................... | G06K 7/084 235/449 |
| 6,513,713 | B1 * | 2/2003 | Aruga ................... | G06K 7/084 235/493 |
| 2003/0085277 | A1 * | 5/2003 | DeLand, Jr. ........... | G06K 7/087 235/449 |
| 2013/0046227 | A1 | 2/2013 | Hyde et al. | |

* cited by examiner

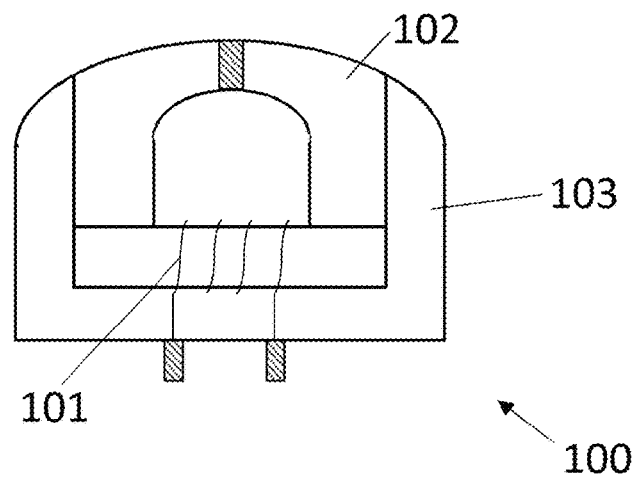
Fig. 1 (prior art)
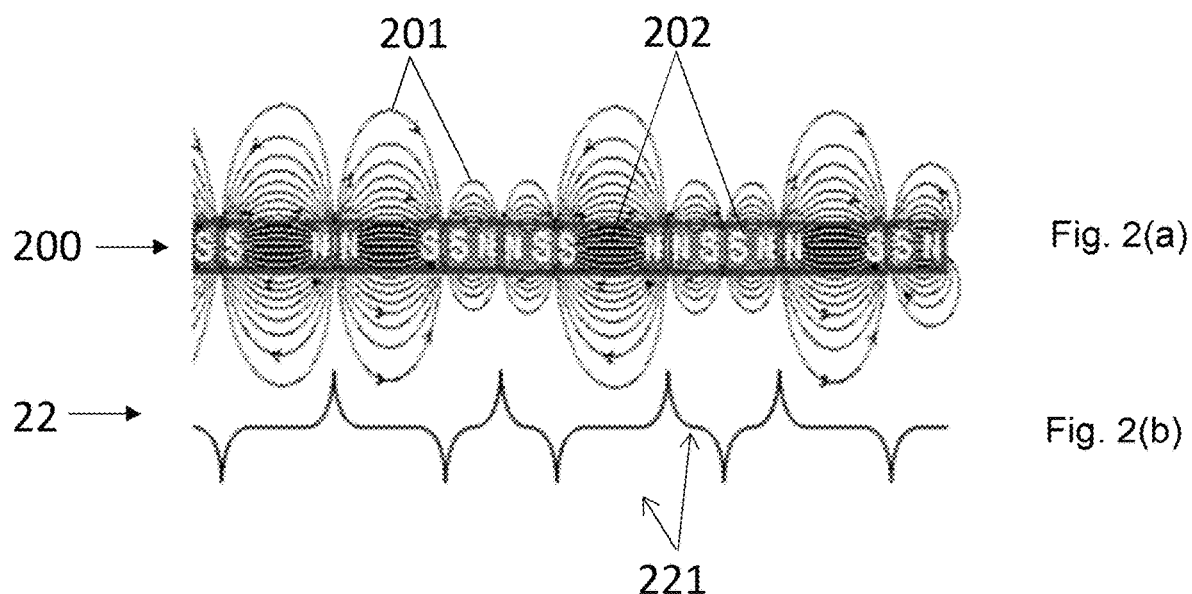
Fig. 2(a)
Fig. 2(b)
(prior art)

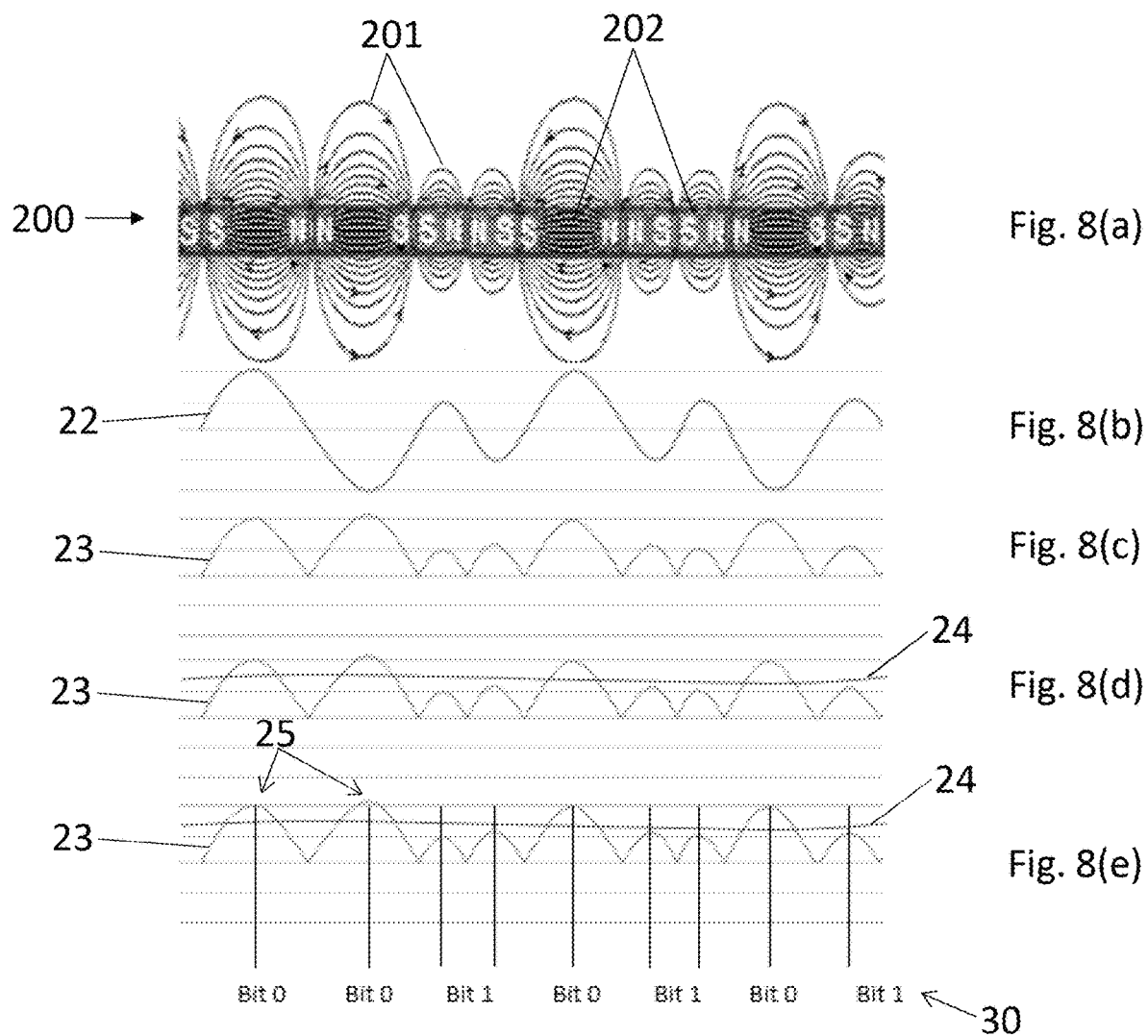

READER DEVICE FOR READING INFORMATION STORED ON A MAGNETIC STRIP AND A METHOD FOR DECODING THE READ INFORMATION

FIELD

The invention relates to a magnetic stripe reader, specifically to an apparatus and system configured for decoding magnetic stripes using a magnetoresistive sensor element. The invention further relates to a method decoding magnetic stripes using the apparatus and system.

BACKGROUND

Magnetic stripes are typically found in credit and debit cards, gift cards, hotel keycards, membership and loyalty cards. These magnetic stripes are used to store information typically related to the card holder. Data can be stored on these magnetic stripes using standard international specifications or custom protocols.

A magnetic stripe is composed of a multitude of small magnetic elements that can be programmed by switching their magnetization. Typically credit cards can store 75 bits per inch or 210 bits per inch depending on the track. The number of bits per inch relates to the width (or pitch) of the magnetic elements that constitute the track on the stripe. Magnetic stripes can also be found in cassettes and long-term storage devices such as hard drives.

Typically, to extract information from the magnetic stripe, a magnetic reader head (MRH) is used. FIG. 1 shows a cross section view of a typical MHR 100. The MRH 100 typically comprises a coil 101, usually made of copper, a ferrite core 102, usually made of stacked sheets of iron (Fe), and aluminum housing 103.

FIGS. 2a and 2b show a cross section view of a magnetic stripe 200 (FIG. 2a) and a read signal 22 (FIG. 2b) delivered by the MRH 100. The MRH 100 operates as follows: the ferrite core 102 is put in contact with the magnetic stripe 200. Since the ferrite core 102 has a higher magnetic permeability than air, the magnetic field 201 generated by the magnets 202 on the stripe 200 is channeled through the ferrite core 102. The ferrite core 102 has a magnetic permeability of $6.3 \times 10^{-2}$ H/m and air has a magnetic permeability of $1.25663753 \times 10^{-6}$ H/m.

When the magnetic head 100 crosses from one magnet 202 to the other on the magnetic stripe 200, the orientation of the field 201 (or the sign of the field) is reversed. This makes the coil's output voltage spike (221), since the coil output voltage V follows Faraday's law as shown by Equation (1):

$$V = -NA\frac{dB}{dt} = -NA\frac{B_2 - B_1}{t_2 - t_1} \qquad \text{Equation (1)}$$

Where A is the area of the coil 101, B is the magnetic field, $B_1$ is the magnetic field having a first polarity measured during a first period $t_1$ and $B_2$ is the magnetic field having a second polarity, opposed to the first polarity, measured during a second period $t_2$, and N is the number of turns of the coil 101.

Since B1 and B2 have opposite polarity, under a short time, the coil output voltage V spikes 221. This spike is extremely important for the decoding algorithm because it determine the edge of the magnets 202 of the stripe 200.

FIG. 3 shows schematically the MRH 100 and a typical circuitry for processing the read signal 22. The read signal 22 delivered by the MRH 100 is then fed to a filter-amplifier circuit 110 providing a filtered analog signal 26 that is then fed into a decoder 111 to extract binary data 30. Decoding is typically performed using a two-frequency coherent phase (F2F) technique, whereby the decoder extracts a reference period T from the signal, then compares this reference period to the period being acquired.

FIG. 4 shows how the analog read signal 22 of the magnetic head 100 is first digitized then decoded (binary data 30). If the period of the binary data 30 is the same as the reference period T, the bit is decoded as a "0". If the period of the binary data 30 is double the reference period T, the bit is decoded as a "1" (i.e. double the frequency).

Every magnetic stripe starts with many bit "0" (i.e. large magnets) usually around 60. These bits are used to determine the reference period that will be used to decode the rest of the stripe.

This device only senses the transitions between the magnet, it does not provide a representation of the absolute magnetic field, in terms of sign and amplitude, generated by the different magnets on the magnetic stripe.

Manufacturing bottlenecks of MRH design include the overall size and cost of the magnetic head, the number of turns of the copper wire needs to be high for higher voltage output, the flux guide comprises many small plates to increase bandwidth by limiting Eddie currents, the gap needs to be tightly controlled at around 10 μm to have high voltage outputs, and installing the flux guide inside the coil.

The frequency based decoding algorithm (also known as F2F decoding algorithm) has several limitations, especially when hand sweeping the card into a reader. Namely, when sweeping the card slowly, the time between every flux changes is large, which means the voltage output is low. When sweeping too fast, we reach the bandwidth limit and loose on the voltage output level.

If the swipe acceleration changes (either one or multiple accelerations/decelerations), the frequency based decoding scheme fails. If the swipe is stopped, the user needs to restart again.

The magnet sizes of the stripe can change by up to ±22%, this makes the frequency based decoding difficult because the algorithm needs to take the variability of magnet size into account.

SUMMARY

The present disclosure relates to a magnetic stripe reader comprising a magnetoresistive sensor element and a system and a method for extracting the binary data.

In one aspect, the magnetic stripe reader can be a fully enclosed (i.e. single chip solution) and comprise the sensor element and the subsequent circuitry for decoding the raw signal from the sensor.

the magnetic stripe reader can further comprise a multi-chip solution, using a standalone sensor element and the subsequent circuitry in a separate chip or in an SOC solution.

In another aspect, raw signal of the magnetoresistive sensor can be decoded using the standard F2F method or by a novel "Amplitude based decoding" algorithm, or a combination of both. The magnetoresistive sensor is sensitive to the magnetic field (H) direction (i.e. sign) and amplitude. Using the amplitude sensitivity of the magnetoresistive sensor allows for novel features such as: variable speed and acceleration during the reading of the magnetic stripe, recovery from a complete stop during a swipe, improved tolerances to magnetic stripes with variable data bits pitch.

BRIEF DESCRIPTION OF THE DRAWINGS

The invention will be better understood with the aid of the description of an embodiment given by way of example and illustrated by the figures, in which:

FIG. 1 shows a cross section view of a conventional MRH;

FIGS. 2a and 2b show a cross section view of a magnetic stripe (FIG. 2a) and a read signal (FIG. 2b) delivered by the conventional MRH;

DETAILED DESCRIPTION OF POSSIBLE EMBODIMENTS

Figure 3:
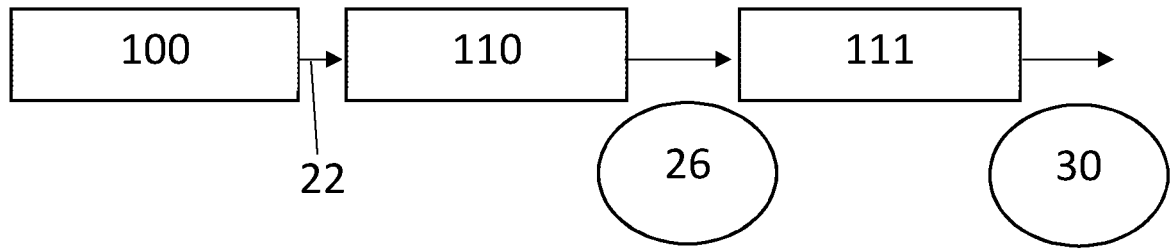
FIG. 3 is a schematic representation of the conventional MRH and circuitry for processing the read signal.
Figure 4:
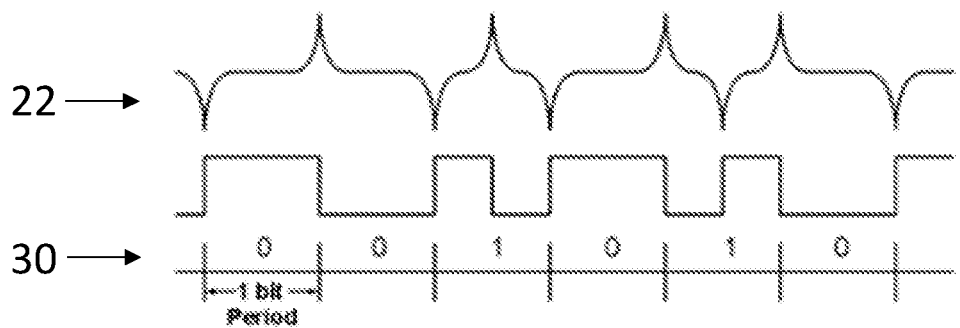
FIG. 4 illustrates digitizing and decoding of the analog read signal.
Figure 5:
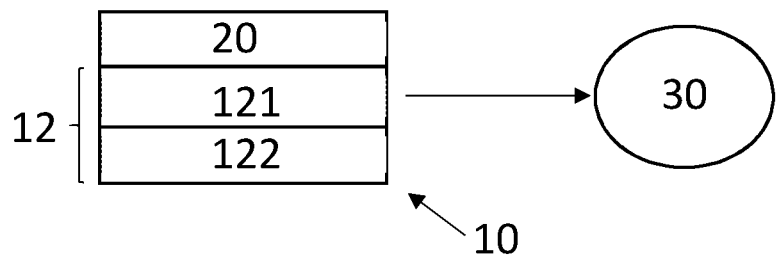
FIG. 5 shows a schematic representation of a reader device comprising a magnetoresistive sensor including a plurality of magnetoresistive elements, according to an embodiment.

FIG. 5 shows a schematic representation of a reader device 10 according to an embodiment. The reader device 10 comprises a magnetoresistive sensor 20 including a plurality of magnetoresistive elements 21 and configured for reading the information stored on a magnetic strip and outputting a read signal 22. The reader device 10 further comprises a processing module 12 configured for decoding the read signal 22 and extracting binary data 30.

The reader device 10 is configured for reading information stored on a magnetic strip 200 (see FIG. 7) containing a plurality of polarized magnets 202, each providing a magnetic field 201. The read signal 22 comprises amplitude information of the magnetic flux and the processing module 12 is configured for decoding the read signal 22 using the amplitude information of the read signal 22.

Figure 6:
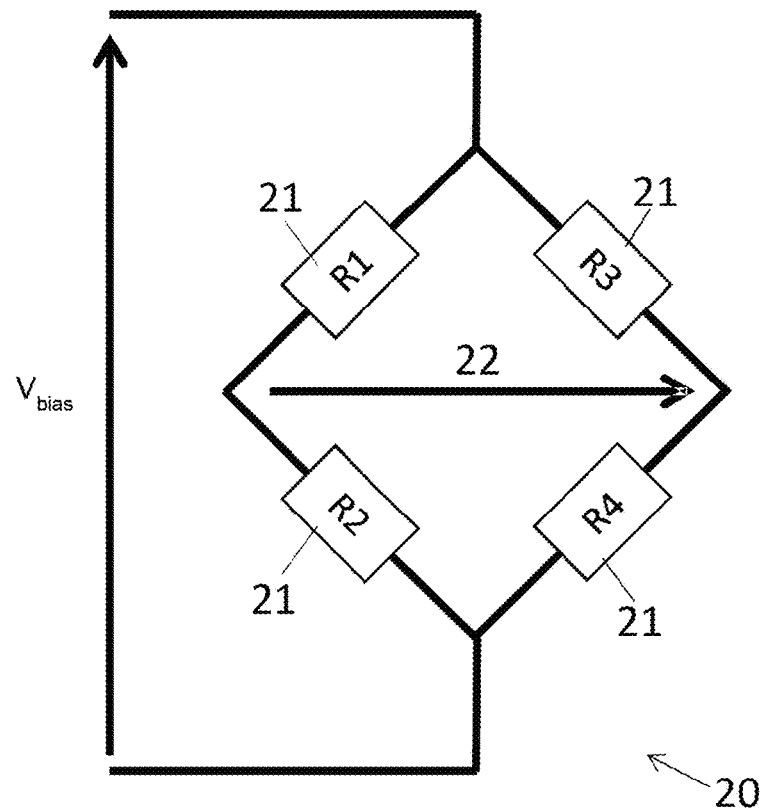
FIG. 6 illustrates the magnetoresistive elements arranged in a Wheatstone configuration.

FIG. 6 shows a possible embodiment, wherein the plurality of magnetoresistive elements 21 are connected according to a Wheatstone (full-bridge) configuration. In this configuration, the read signal 22 can be measured between the node formed between the magnetoresistive elements 21 $R_1$ and $R_2$ and the node formed between the magnetoresistive elements 21 $R_3$ and $R_4$ (measurement diagonal). The value of the read signal 22 depends on the ratio of the resistances $R_1:R_2$ and $R_4:R_3$ of the magnetoresistive elements 21. Of course, other series and/or parallel arrangements are possible including half-bridge configuration.

The magnetoresistive element 21 can comprise a hall effect sensor. Alternatively, the magnetoresistive element 21 can comprise a xMR sensor, i.e., any one of or a combination of: an anisotropic magneto-resistance (AMR), giant magneto-resistance (GMR) or magnetic tunneling junction (TMR)-based sensor.

Figure 7A:
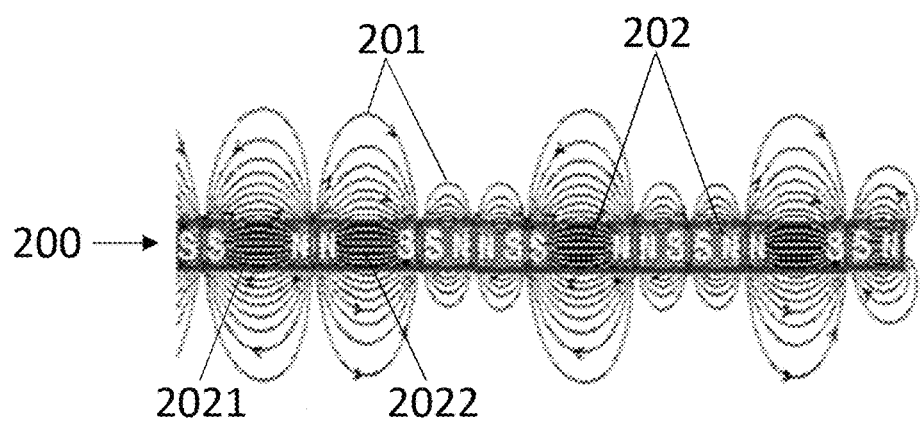
FIGS. 7a and 7b show a cross section view of a magnetic stripe (FIG. 7a) and a read signal (FIG. 7b) delivered by FIGS. 8a-8e represents the steps of a amplitude decoding method for decoding a read signal outputted by the reader device, according to an embodiment.
Figure 7B:
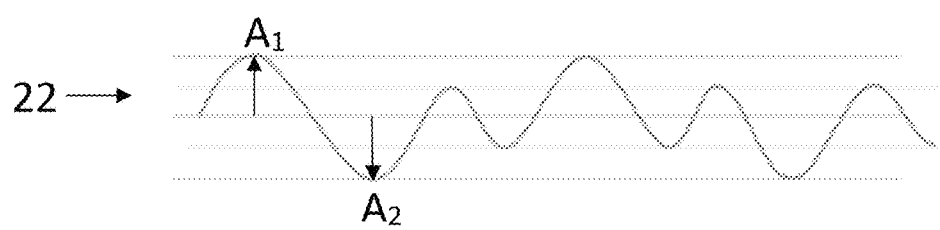

FIGS. 7a and 7b show a cross section view of a magnetic stripe 200 (FIG. 7a) and a read signal 22 (FIG. 7b) delivered by the magnetoresistive sensor 20. The magnetic strip 200 contains a plurality of polarized magnets 202, each providing a magnetic field 201.

In the example of FIG. 7b, it is assumed that the read signal 22 is outputted by the magnetoresistive sensor 20 comprising TMR-based magnetoresistive elements 21. A TMR-based magnetoresistive element 21 has a resistance that varies with varying the magnitude and polarity of the magnetic field 201 produced by the magnets 202. Consequently, the read signal 22 comprises amplitude and polarity information of the magnetic field 201. For example, the read signal 22 has an positive amplitude $A_1$ when the reader device 10 is in the vicinity of the magnet 2021 having a first polarity, and the read signal 22 has an negative amplitude $A_2$ when the reader device 10 is in the vicinity of the magnet 2022 having a second polarity, opposed to the first polarity.

The magnetoresistive elements 21 are thus adapted to measure a magnetic field magnitude and polarity, and not only a change of the magnetic field such as when using a coil. This is in contrast with the read signal delivered by a conventional MRH (see FIG. 2b) comprises only spikes corresponding to a change in polarity of the magnetic field 201.

FIGS. 8a-8e represents an amplitude decoding method for decoding the read signal 22 outputted by the magnetoresistive sensor 20 of the reader device 10, when reading a magnetic strip 200 (FIG. 8a), according to an embodiment. The amplitude decoding method comprises the steps of:

moving the reader device 10 along a magnetic strip 200 and outputting a corresponding read signal 22 from the magnetoresistive sensor 20 (FIG. 8b);

determining the absolute value signal 23 from the read signal 22 (FIG. 8c);

from the absolute value signal 23, determining a threshold value 24 (FIG. 8d);

providing a binary data 30 by detecting peaks 25 from the derivative of the absolute value signal 23 (FIG. 8e);

for each detected peak 25, comparing the absolute value signal with the threshold value 24; and assigning a bit "0" if the absolute voltage value is higher than the threshold value and assigning a bit "1" if the absolute voltage value is lower than the threshold value.

The amplitude decoding method of decoding a magnetic stripe is thus based on the amplitude of the signal rather than frequency as in the F2F technique.

The threshold value 24 can be seen as decision level (or decision criterion) permitting to evaluate if the detected peak 25 corresponds to bit "0" or a bit "1".

In an embodiment, the threshold value 24 can be determined by computing an moving (or running) average value from the absolute value signal 23.

The average value can correspond to a percentage value of the absolute value signal 23. The percentage value can be about 75%. In other words, the running average can represent a percentage value (such as 75%) of the maximum value obtained by continuously measuring in a window.

In a possible mode of carrying the invention, the processing module 12 can comprise a signal conditioning module 121 configured for determining the absolute value signal 23, the threshold value 24 and the threshold value 24, and a decoder module 122 configured for detecting the peaks 25.

Figure 9:
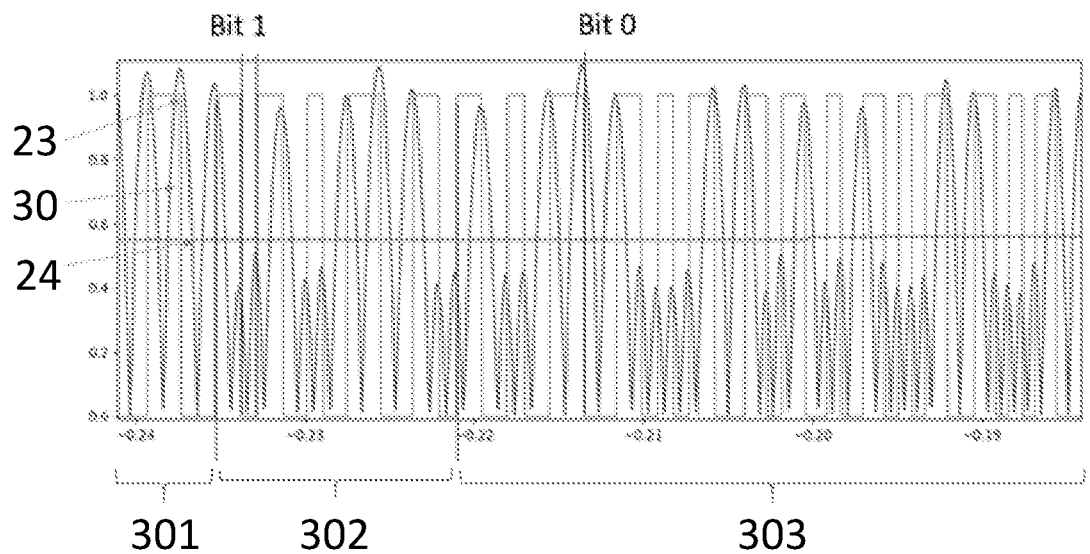
FIG. 9 shows a real-life example of a magnetic strip being decoded by using the reader device in combination with the amplitude decoding method.

FIG. 9 shows a real-life example of a magnetic strip 200 (of a credit card) being decoded by using the reader device 10 in combination with the amplitude decoding algorithm. According to the ISO 7811-4 standard, a credit card magnetic strip 200 comprises alphanumeric data characters comprising leading zeros 301, start sentinel 302 and data 303 (primary account number, name, additional data, etc.).

According to the ISO 7811-4 standard, track 1 that holds the credit card number, expiration date and card holder full name is 210 bits per inch tracks require the sensor to be at 60 μm from the stripe.

If the distance between the magnetoresistive sensor 20 and the magnetic strip 200 is higher than the pitch of the magnet 202, the magnetoresistive elements 21 in the magnetoresistive sensor 20 may not be able to pick up the magnetic field 201 generated by each magnet 202 on the magnetic strip 200.

The thickness of the reader device 10 can be decreased, allowing for decreasing the distance between the magnetoresistive sensor 20 and the magnetic strip 200 and for increasing the reading resolution. The thickness of the reader device 10 can be reduced by stacking the magnetoresistive sensor 20, the conditioning module 121 and the decoder module 122 vertically in a single chip package (see FIG. 5).

In another embodiment, decoding the read signal can further comprise using the amplitude decoding method in combination with the F2F technique. The combination of the amplitude decoding method and the F2F technique allows for reducing the failure rate.

The amplitude decoding method can be used as a "complementary" decoding method to the standard F2F technique. The amplitude decoding method can be used to enhance the decoding instead of a standalone decoding methodology.

Indeed, frequency based decoding F2F technique is sensible to the size of the magnetic magnets 202 of the magnetic stripe 200. The ISO specification allows for up to ±20% difference in pitch, which in combination with speed and acceleration variability, increases the failure rate of decoding based only of frequency. On the other hand, the amplitude decoding method is sensible to the amplitude of the magnetic field 201 generated by the magnetic magnets 202 of the magnetic stripe 200 and the quality of magnetization of these magnets 202 affects the amplitude decoding failure rate.

Using a combination of the F2F technique and the amplitude decoding method allows for reducing the overall failure rate of the decoding system.

Figure 10:
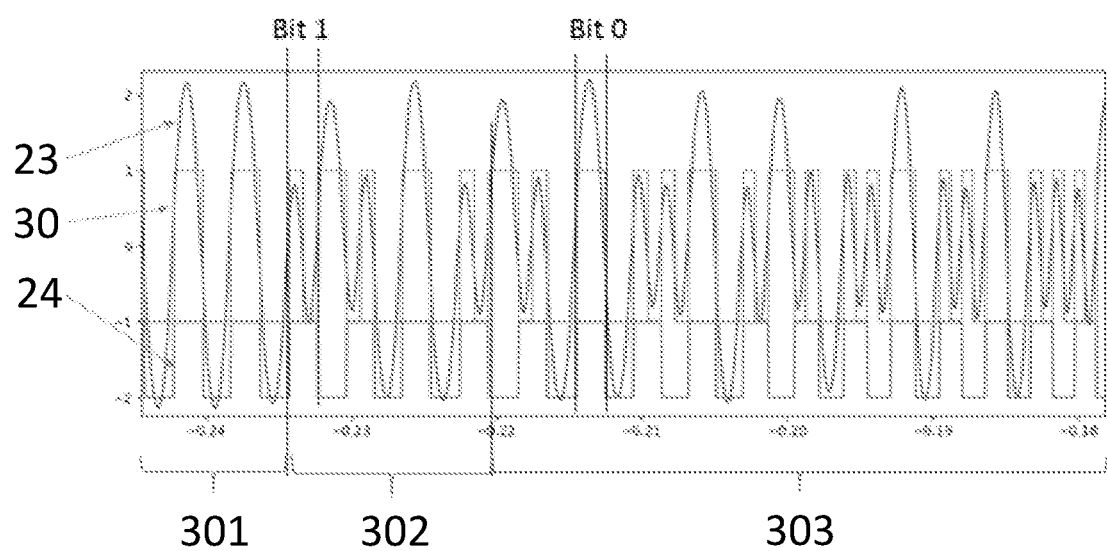
FIG. 10 a real-life example of a magnetic strip being decoded by using the reader device in combination with a F2F technique.

FIG. 10 a real-life example of a magnetic strip 200 (of a credit card) being decoded by using the reader device 10 in combination with a F2F technique.

The binary data 30 can be encrypted. Such encryption can block any middle man attack.

In an embodiment, the magnetoresistive sensor 20 and the processing module 12 are formed on a single monolithic chip. The single chip solution allows for a fully integrated reader device 10 that can read the magnetic field 201 and output binary data 30 using a standard communication protocol (i.e. SPI, I2C, etc.).

The magnetoresistive sensor 20 can comprise a flux guide. The flux guide can include at least a flux guide layer (not shown) located adjacent to (or in the vicinity of) the magnetic strip 200 or any other configuration such as the ones used on a standard MRH.

Since the magnetoresistive sensor 20 can measures the read signal 22 from DC upwards (at any frequency), the reader device 10 can sweep the magnetic stripe 200 at any speed. In other words, the voltage output of the magnetoresistive sensor 20 is able to follow any reader device 10 sweep speed.

Moreover, the amplitude decoding method is completely insensitive to the acceleration in the reader device 10 sweep. The sweep of the reader device 10 can be completely stopped and stared again without disrupting the acquisition of the read signal 22.

The amplitude decoding method allows for avoiding the problem of non-uniformity of the magnet sizes in the magnetic stripe. For example, ISO specifications allows for a 20% variation.

The amplitude of the read signal 22 gives an insight into the coercivity of the magnets of the magnetic stripe (quality check at every sweep scan).

The reader device 10 and the amplitude decoding method described herein makes possible smallest, thinnest and lightest card readers, a very important advantage for mobile POS equipment and accessories.

REFERENCE NUMBERS AND SYMBOLS 10 reader device
100 magnetic reader head (MRH)
101 coil
102 core
103 housing
110 filter-amplifier circuit
111 decoder
12 processing module
121 signal conditioning module
122 decoder module
20 magnetoresistive sensor
21 magnetoresistive element
22 read signal
23 absolute value signal
24 threshold value
25 peak
26 filtered analog signal
200 magnetic stripe
201 magnetic field
202 magnet
221 spike
30 binary data

The invention claimed is:

1. A reader device for reading information stored on a magnetic strip containing a plurality of polarized magnets, each providing a magnetic flux, said reader device comprising:

a magnetoresistive sensor including a plurality of magnetoresistive elements and configured for reading the information stored on the magnetic strip and outputting a read signal;

a processing module configured for decoding the read signal and extracting binary data;

wherein the read signal comprises amplitude information of the magnetic flux; and wherein the processing module is further configured for:
decoding the read signal using the amplitude information of the read signal by determining an absolute value signal from the read signal;
from the absolute value signal, determining a threshold value;
detecting peaks from a derivative of the absolute value signal;
for each detected peak, comparing the absolute value signal with the threshold value; and assigning a bit "0" if an absolute voltage value is higher than the threshold value and assigning a bit "1" if the absolute voltage value is lower than the threshold value.

2. The reader device according to claim 1, wherein said plurality of magnetoresistive elements are connected in series and/or parallel according to a half-bridge or full-bridge configuration.

3. The reader device according to claim 1, wherein the magnetoresistive sensor and the processing module are formed on a single chip.

4. The reader device according to claim 1, wherein said processing module comprises a signal conditioning module and a decoder module.

5. The reader device according to claim 4, wherein the magnetoresistive sensor, the conditioning module and the decoder module are stacked vertically in a single chip package.

6. The reader device according to claim 1, wherein the magnetoresistive sensor comprises a flux guide.

7. The reader device according to claim 1, wherein the magnetoresistive element comprises a hall effect sensor.

8. The reader device according to claim 1, wherein the magnetoresistive element comprises one of or a combination of: an anisotropic magneto-resistance, giant magneto-resistance or magnetic tunneling junction-based sensor.

9. Amplitude decoding method for decoding a read signal outputted by a reader device comprising a magnetoresistive sensor including a plurality of magnetoresistive elements and configured for reading the information stored on the magnetic strip and outputting the read signal; a processing module configured for decoding the read signal and extracting binary data; the read signal comprising amplitude information of the magnetic flux; and the processing module being further configured for decoding the read signal using the amplitude information of the read signal; the method comprising:
    determining an absolute value signal from the read signal;
    from the absolute value signal, determining a threshold value;
    detecting peaks from a derivative of the absolute value signal;
    for each detected peak, comparing the absolute value signal with the threshold value; and
    assigning a bit "0" if an absolute voltage value is higher than the threshold value and assigning a bit "1" if the absolute voltage value is lower than the threshold value.

10. The amplitude decoding method according to claim 9, wherein said determining a threshold value comprises computing an average value from the absolute value signal.

11. The amplitude decoding method according to claim 10, wherein the average value corresponds to a percentage value of the absolute value signal.

12. The amplitude decoding method according to claim 11, wherein the percentage value is about 75%.

13. The amplitude decoding method according to claim 9, wherein said decoding the read signal further comprises using a two-frequency coherent phase technique.

* * * * *